July 16, 1968  J. MARINELLI  3,392,988
MOUNTING BRACKET FOR CHASSIS EQUALIZER ASSEMBLY
Filed Oct. 20, 1966
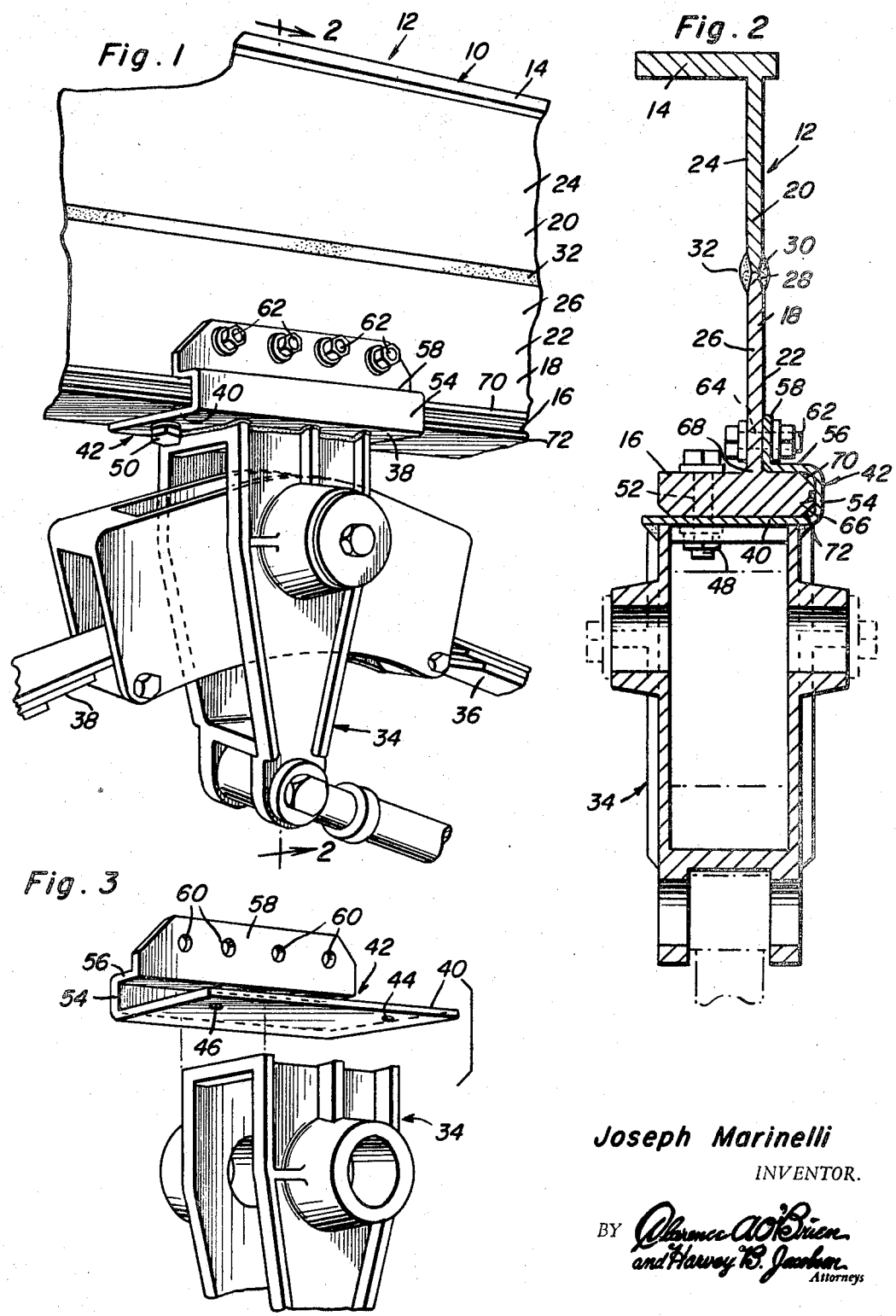
Joseph Marinelli
INVENTOR.

United States Patent Office 3,392,988
Patented July 16, 1968

3,392,988
MOUNTING BRACKET FOR CHASSIS
EQUALIZER ASSEMBLY
Joseph Marinelli, New Castle, Pa., assignor to City Welding & Manufacturing Co., Inc., a corporation of Pennsylvania
Filed Oct. 20, 1966, Ser. No. 588,135
6 Claims. (Cl. 280—106)

This invention relates to a novel and useful mounting bracket and more specifically to a mounting bracket adapted to be utilized in securing a tandem axle equalizer assembly hanger bracket to an elongated structural beam of a heavy load capacity vehicle.

The bracket of the instant invention has been designed primarily for use in securing a steel hanger bracket to an extruded aluminum I-beam of a vehicle frame.

Heavy load capacity vehicles such as extremely large semi-trailers have for some time been constructed so as to include frames including one or more longitudinal structural beams constructed of steel. When utilizing such steel beams steel hanger brackets for various types of running gear may be readily utilized inasmuch as the hanger brackets may include mounting flange portions that may be readily bolted to steel beams. Further, such mounting brackets or the hanger brackets themselves may be suitably secured to a steel beam by means of welding without adversely affecting the strength of the beam.

However, heavy load capacity vehicles have in recent years been constructed of aluminum in order that the gross weight of the vehicle both loaded and unloaded may be appreciably reduced by an amount equal to the weight savings realized by the construction of the vehicle from aluminum rather than steel. However, the use of aluminum extrusions to fabricate a vehicle chassis or frame of similar strength to steel presents an extremely difficult problem. The initial problem that it presents is the vast difference between the two materials as to the advantages of and ease of fabrication by steel as opposed to aluminum. However, due to the significant difference in weight between aluminum and steel, it becomes very practical to use aluminum as opposed to steel in the manufacture of heavy load rated vehicle frames and bodies. On the other hand, inasmuch as steel is relatively easy to form, a steel beam of a requisite strength may assume many different configurations whereas a beam of aluminum required to support the same amount of weight must be of a shape that yields the greatest amount of strength. Because of the necessity of the cross-sectional shape of an aluminum being such that maximum load carrying capacity will be realized by a given cross-sectional area, the shapes of aluminum beams may not be governed by a particular type of bracket which is to be secured thereto. Conversely, inasmuch as a steel beam may be more varied in cross-sectional shape, a cross-sectional shape better suited to a particular mounting bracket position may be utilized.

It is accordingly the main object of this invention to provide a steel mounting bracket specifically designed to be utilized in securing a depending hanger bracket to an aluminum structural beam whose cross-sectional shape has been designed to yield maximum strength of the cross-sectional area of the beam and which is therefore not well suited to have conventional mounting brackets bolted thereto.

Another object of this invention, in accordance with the immediately preceding object, is to provide a mounting bracket which will not only serve the purpose of securing a depending hanger bracket to a horizontal extruded aluminum beam but which will also serve to reinforce the joint between the upstanding web portion of the aluminum beam and the bottom flange of the aluminum beam.

Yet another object of this invention is to provide an aluminum beam specifically designed in cross-sectional shape to withstand heavy loads when horizontally loaded.

A further object of this invention, in accordance with the immediately preceding object, is to provide a mounting bracket constructed of steel specifically adapted to be utilized in conjunction with the aluminum beam immediately above referred to.

A final object of this invention to be specifically enumerated herein is to provide an aluminum beam and steel mounting bracket therefor which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of the frame and running gear of a semi-trailer vehicle illustrating the manner in which the steel mounting bracket of the instant invention is specifically adapted to mount a tandem axle equalizer assembly hanger bracket from the corresponding extruded aluminum longitudinally extending beam of the frame;

FIGURE 2 is an enlarged transverse vertical sectional view taken substantially upon the plane indicated by the section line 2—2 of FIGURE 1 and with the equalizer assembly supported from the hanger bracket illustrated in phantom lines; and FIGURE 3 is an exploded perspective view illustrating the mounting bracket of the instant invention and the tandem axle equalizer assembly hanger bracket which is to be welded to the mounting bracket.

Referring now more specifically to the drawings the numeral 10 generally designates a vehicle frame such as that which may be utilized in the construction of a heavy load capacity semi-trailer and which includes a longitudinal structural beam referred to in general by the reference numeral 12. The beam 12 includes top and bottom generally horizontally disposed and longitudinally extending flanges 14 and 16 interconnected by means of an upstanding web portion 18. The beam 12 includes upper and lower beam sections 20 and 22, the upper section 20 including the top flange 14 and a top web section 24 and the lower section including the bottom flange 16 and a lower web section 26. The upper and lower marginal edge portions of the lower and upper web sections 26 and 24 are somewhat beveled as at 28 and 30 and rigidly secured together by welding 32 with the upper and lower sections 20 and 22 in coplanar relation.

The top flange 14 projects from opposite sides of the web portion 18 as does the bottom flange 16. Further, the bottom flange 16 is on the order of three times as thick as the web portion 18.

With attention now invited more specifically to FIGURE 1 of the drawings there may be seen a tandem axle equalizer assembly hanger bracket generally referred to by the reference numeral 34 to which the corresponding leaf spring assemblies 36 and 38 of a pair of tandem axle assemblies (not shown) are secured. The hanger bracket 34 is constructed of steel and includes coplanar upper surface portions which are secured to the undersurface 38 of the base flange 40 of a steel mounting bracket generally referred to by the reference numeral 42.

The base flange 40 is provided with suitable apertures 44 and 46 through which suitable fasteners 48 and 50 are secured, the fasteners 48 and 50 also passing through suitable bores 52 provided therefor in the base flange 16. The fasteners 48 and 50 are spaced outwardly from one side of the web portion 18 and are therefore readily accessible.

The base flange 40 terminates at one longitudinal edge portion in a first upstanding flange 54 which in turn terminates at its upper edge portion in a back turned flange 56. The edge portion of the flange 56 remote from the flange 54 terminates in a second upstanding flange 58 suitably apertured as at 60 for the reception of fasteners 62 therethrough, the latter also extending through suitable bores 64 provided therefor in the lower surface 22 of the web portion 18.

A channel 66 which opens horizontally and laterally outwardly of one side of the bracket 42 is defined between the base flange 40 and the back turned flange 56. The side of the bottom flange 16 disposed on the side of the lower section 22 of the web portion 18 remote from the bores 52 is snugly received in the channel 66 and reinforces the juncture 68 between the lower section 22 of the web portion 18 and the bottom flange 16.

The upper and lower outer edges of the side of the bottom flange 16 remote from the bores 52 are beveled as at 70 and 72 and therefore it may be seen that the bracket 42 may be formed of one continuous plate-like steel member having suitable bends formed therein joining the various adjacent flange portions thereof without the bottom flange 16 interfering with the bends 42 joining the flange 56 with the flange 54 and the flange 54 with the flange 40.

The various flanges 40, 54, 56 and 58 are right angularly disposed relative to the adjacent flanges and inasmuch as the base flange 40 is bolted to the bottom flange 16 by means of the bolts 48 and the second upstanding flange 58 is bolted to the lower section 22 of the web portion 18 by means of the bolts 62, an extremely rigid connection is formed between the hanger bracket 34 and the beam 12. The "wrap around" feature of the mounting bracket 42 reinforces the juncture 68 and in this manner it has been found possible to mount a hanger bracket such as hanger bracket 34 on an aluminum beam such as beam 12 without adversely affecting the load carrying capacity of the beam 12 or the latter experiencing fatigue in the area of the juncture 68, which conditions are frequently experienced when attempting to mount hanger brackets such as hanger brackets 34 from an aluminum beam by the utilization of conventionally shaped mounting brackets.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with an aluminum beam of the type including an upstanding longitudinally extending web portion terminating along its lower edge portion in an integral transversely enlarged and longitudinally extending bottom flange, a steel bracket including a base flange having opposite side longitudinal edge portions and underlying and fastened to the undersurface of said bottom flange by means of fasteners secured through said base flange and bottom flange adjacent one longitudinal edge portion of said base flange and disposed on one side of said web portion, the other longitudinal edge portion of said base flange terminating outwardly in a first integral upstanding flange terminating at its upper edge portion in an integral back-turned flange overlying said base flange and terminating at its edge remote from said first upstanding flange in a second integral upstanding flange, said base and backturned flanges being generally parallel and defining, together with said first upstanding flange, a horizontally laterally opening channel snugly receiving the portions of said bottom flange disposed on the other side of said web portion therein, and fasteners secured through said second upstanding flange and said web, said base being adapted to have a hanger bracket secured thereto by welding.

2. The combination of claim 1 wherein said beam includes a pair of upper and lower beam halves, said lower half including said bottom flange and an upwardly projecting lower web section comprising said web portion, a longitudinally extending and transversely enlarged upper half including said top flange and a downwardly projecting upper web section, the upper and lower marginal edge portions of said lower and upper web sections, respectively, being secured together by welding.

3. The combination of claim 1 wherein the upper and lower corner portions of the edge portion of said bottom flange are beveled and said steel bracket is formed of a single piece of plate-like material bent into shape to form the various angulated adjacent flanges thereof.

4. The combination of claim 3 wherein each pair of adjacent flanges of said steel bracket are right angularly disposed relative to each other.

5. The combination of claim 4 wherein said bottom flange is of a thickness appreciably greater than the thickness of said web portion.

6. The combination of claim 5 wherein the vertical thickness of said bottom flange is approximately three times the thickness of said web portion.

References Cited

UNITED STATES PATENTS

| | | | |
|---|---|---|---|
| 2,844,864 | 7/1958 | Schilberg | 280—106 X |
| 1,405,637 | 7/1922 | Sternberg | 280—106 |
| 2,653,035 | 9/1953 | Ward | 280—104.5 |

PHILIP GOODMAN, *Primary Examiner.*